(12) United States Patent
Mietens et al.

(10) Patent No.: US 8,200,033 B2
(45) Date of Patent: Jun. 12, 2012

(54) ENCODING METHOD AND APPARATUS APPLYING COEFFICIENT REORDERING

(75) Inventors: Stephan Oliver Mietens, Stuttgart (DE); Mark Jozef Willem Mertens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1048 days.

(21) Appl. No.: 12/095,140

(22) PCT Filed: Nov. 27, 2006

(86) PCT No.: PCT/IB2006/054439
§ 371 (c)(1), (2), (4) Date: May 28, 2008

(87) PCT Pub. No.: WO2007/063472
PCT Pub. Date: Jun. 7, 2007

(65) Prior Publication Data
US 2009/0046941 A1    Feb. 19, 2009

(30) Foreign Application Priority Data
Nov. 30, 2005    (EP) .................... 05111502

(51) Int. Cl.
*G06K 9/36* (2006.01)
(52) U.S. Cl. ...................................................... 382/250
(58) Field of Classification Search .................. 382/232, 382/233, 236, 239, 282, 250, 251
See application file for complete search history.

(56) References Cited

U.S. PATENT DOCUMENTS

| 4,794,078 A | 12/1988 | Blair | |
| 6,882,755 B2 * | 4/2005 | Silverstein et al. | 382/282 |
| 2003/0007698 A1 | 1/2003 | Govindaswamy et al. | |
| 2008/0199091 A1 * | 8/2008 | Srinivasan et al. | 382/239 |

FOREIGN PATENT DOCUMENTS

EP    0836328 A2    4/1998

OTHER PUBLICATIONS

Lee et al: "An Efficient Encoding of DCT Blocks With Block-Adaptive Scanning"; IEICE Trans. Commun., vol. E77-B, No. 12, Dec. 1994, pp. 1489-1494.
Zhou, M: "Digital Video Broadcasting With Improved Picture Quality"; Optimization of MPEG-2 Video Coding, Section 8.3: Scanning Path, pp. 112-115. Aug. 1997.
Zhou et al: An Improved Adaptive Selection of Scanning Path for DC/AC Prediction; ISO/IEC JTC1/SC29/WG11 MPEG97/1600, Jan. 1997, pp. 1-5.
Yamada et al: "An Adaptive Scanning Method for Runlength Wavelet Coding"; ISO/IEC JTC1/SC29/WG11 MPEG97/1764, Feb. 1997, pp. 1-9.
Sullivan, G.: "Draft Text of Recommendation H.263 Vresion 2(H. 263+) for Decision"; ITU-T Draft Recommendation H.263 Version 2, Jan. 27, 1998, 153 Page Document.

* cited by examiner

*Primary Examiner* — Duy M Dang

(57) ABSTRACT

In a method of encoding and encoder a method step is performed in which the scan order of a set of image region modeling coefficients is established on the basis of information of set of image region modeling coefficients preceding said set of image region modeling coefficients, and said set of image region modeling coefficients subsequently undergoes a scan ordering.

30 Claims, 12 Drawing Sheets

Block 1

Block 2

Block m

Block m+1

FIG. 5

ENCODING METHOD AND APPARATUS APPLYING COEFFICIENT REORDERING

The invention relates to a method of encoding a sequence of sets of image region modeling coefficients into a sequence of reordered sets of image region modeling coefficients, wherein the encoding of a set of image region modeling coefficients into a reordered set of image region modeling coefficients is performed according to a scan order.

The invention also relates to an encoder for encoding a sequence of sets of image region modeling coefficients into a sequence of reordered sets of image region modeling coefficients, wherein the encoding of a set of image region modeling coefficients into a reordered set of image region modeling coefficients is performed according to a scan order.

The invention also relates to a method of decoding a sequence of reordered sets of image region modeling coefficients into a sequence of reconstructed sets of image region modeling coefficients, wherein the decoding of a reordered set of image region modeling coefficients into a reconstructed set of image region modeling coefficients is performed according to a reverse scan order.

The invention also relates to a decoder for decoding a sequence of reordered sets of image region modeling coefficients into a sequence of reconstructed sets of image region modeling coefficients, wherein the decoding of a reordered set of image region modeling coefficients into a reconstructed set of image region modeling coefficients is performed according to a reverse scan order.

The invention also relates to a transmitter comprising an encoder and a receiver comprising a decoder.

The invention further relates to a signal comprising reordered image modeling coefficients and a storage medium having reordered image-modeling coefficients stored thereon. It further relates to a signal and a storage medium having information pertaining to the algorithms or parameters used for determining the scan order or used or for use in the scan order determinator and/or scan order determination.

In data transmission (or storage, which can in the framework of the present invention be regarded as transmission to a memory) of image information, the efficiency of the transmission of data is very important. For transmission purposes the data are compressed as much as possible before transmission. Compression of data is often done by encoding sets of image region modeling coefficients into encoded sets of image region modeling coefficients wherein the encoded sets of image region modeling coefficients comprise less bits than before encoding or at least require less bits to be transmitted. In image compression, wherein within the concept of the invention image is to be broadly interpreted, low bit rates of a coded image or video sequence are possible by transformation of blocks of pixels in the spatial domain in blocks of coefficients in a transform domain, such as for instance DCT (discrete cosine transform) coefficients, wavelet coefficients or other coding coefficients. Such a transformation of pixel data into transform domain data in itself usually does not or only slightly reduce the number of bits needed to transmit the image information. However, a substantial reduction of bits is possible by quantizing of the transform domain coefficients, followed by (variable length) encoding of the quantized values of the transform domain coefficients, within the framework of the present invention forming an example of a 'set of image region modeling coefficients', into a re-ordered set of image region modeling coefficients. The latter encoding is performed using a scan order for the set of quantized transform coefficients. For instance for quantized DCT coefficients, which may be considered as to be arranged in blocks of size n×m, often of size n×n, various scan orders are known. Zigzag scanning, vertical scanning and alternate scan are e.g. known methods for scanning the coefficients. Depending on the information, for instance whether or not the block of pixels in the spatial domain comprises an edge or not, and if so, in which direction and/or the scan order in the spatial domain, for instance whether or not interlace scanning is used in the spatial domain, certain scan orders are known to be best suited or at least better suited than others.

It is known that for various types of images different scan orders may best be chosen. In the paper "An efficient Encoding of DCT blocks with block-adaptive scanning' IEICE Trans. Commun. Vol. E-77-B, pages 1489-1494, it is proposed to use a few scanning patterns to encode DCT blocks, wherein the scan orders represent typical distributions of DCT coefficients according to the direction of edges within the image block corresponding to the DCT block. A similar method is known from United States Patent Application US 2003/0007698 and of European Patent application EP 0 836 328. In these known method blocks are classified according to one of K classes, depending on the data in the block, wherein to each class a particular scan order is assigned.

It is also known to compute for a complete image a scan order which would best fit the coefficients of the whole image. Such a method is described in U.S. Pat. No. 4,974,078. In this known method for a complete image and for each DCT coefficient of a DCT block the average value is computed and the scan order for all of the DCT blocks for the complete image is determined such that the coefficient with, on average, the largest value is first in the scan order, the next largest DCT value is second in the scan order, etc. etc.

The inventors have however realized that the known methods, encoder and decoders have the following problems:

U.S. Pat. No. 4,974,078. The data (in the above example the DCT coefficients) in a sequence of set of image region modeling coefficients (in U.S. Pat. No. 4,974,078 being DCT blocks) change from block to block, for instance the characteristics of a video sequence change in terms of coefficient distribution, and such change cannot be incorporated in an average for a whole image.

US 2003/0007698 and European Patent application EP 0 836 328: Each block has to be provided with a classification based on the information in the block, and thus for each block additional information has to be transmitted.

It is thus an object of the invention to overcome, or at least reduce, one or more of the above-cited problems, and to achieve relatively efficient post-transform encoding.

To this end, the method of encoding in accordance with the invention is characterized in that the method comprises a scan order determination in which for a set of image region modeling coefficients a scan order is determined based on the information in a number of sets of image region modeling coefficients preceding the said set of image region modeling coefficients.

The encoder in accordance with the invention is characterized in that the encoder comprises a scan order determinator having an input for receiving a number of sets of image region modeling coefficients, the scan order determinator being arranged for determining the scan order based on information in the number of previously received sets of image region modeling coefficients.

The method of decoding in accordance with the invention is characterized in that it comprises a reverse scan order determination in which for a reordered set of image region modeling coefficients a reverse scan order is determined based on the information in a number of decoded, reconstructed sets of image region modeling coefficients preceding the said reordered set of image region modeling coefficients.

The decoder in accordance with the invention is characterized in that comprises a means for applying to a reordered set of image region modeling coefficients a reverse scan order and comprises a reverse scan order determinator for determining a reverse scan order based on information in a number of decoded, reconstructed sets of image region modeling coefficients preceding the said reordered set of image region modeling coefficients.

The invention is based on the following insights:

In many occasions a set of image region modeling coefficients is similar in characteristics to one or more preceding sets of image region modeling coefficients. For instance, in images or video sequences, sets of image region modeling coefficients depicting a piece of sky, edges (e.g. of buildings), grass/tree like textures will often have similar characteristics. Thus, using information of preceding sets of image region modeling coefficients it is possible to calculate a likely suitable scan order to be used to scan the following set of image region modeling coefficients, i.e. leading to higher compression (e.g. the transmission can be cut at a certain point along the adaptive scan). Depending on the information it is possible, using the information of a number of sets of image region modeling coefficients, to build up a statistical distribution of for instance values of coefficients for previous sets of image region modeling coefficients and based on an analysis of the statistics calculate a most-likely best scan order for a following set of image region modeling coefficients. This following set of image region modeling coefficients is then, using the information gathered from previous sets of image region modeling coefficients, encoded into a reordered set of image region modeling coefficients using the calculated scan order. In practice this will be often be done by means of an algorithm. At the decoder end, the decoder decodes the encoded reordered data and in decoding applies a reverse scan order on the reordered sets of image region modeling coefficients using a same or a similar algorithm to generate reconstructed image region modeling coefficients. Thus the decoder is capable of calculating the scan order used by the encoder, or at least a scan order very close to the scan order used by the encoder (in that visibly little difference occurs, e.g. due to incorrect or dropped high frequency coefficients), which provides for a reverse scan order. It is thus not necessary to send information on the particular scan order used by the encoder with the transmitted data. In short, a determination is made, based on information in a number of preceding sets of image region modeling coefficients, of the best or good scan order for the following set of image region modeling coefficients. Use may be made of various methods, including statistical methods to determine the scan order. The invention amounts to predicting the best or a good scan order for a to be scan ordered set of image region modeling coefficients, without the need of knowledge of said set of image region modeling coefficients. The set of image region modeling coefficients is then encoded using this determined best scan order. The determination is made at both the encoder and the decoder end, or at least similar determinations are made. The method differs from each of the known prior art techniques in that the information in the set of image region modeling coefficients itself is not used. This removes the necessity to transmit for each set of image modeling coefficients an indication of the scan order, yet it offers the flexibility to provide each set of image region modeling coefficients with its own scan order.

It is remarked that the invention may be used with various methods of determination of the scan order. There is a trade off between on the one hand building up the statistics and on the other hand the fine-tuning of the determination of the best suitable scan order. If more effort is put in statistical or probability calculations, the choice of scan order can be more finely tuned at the cost of an increase in computational power.

In one embodiment of the invention a number of scan orders is preset, and, based on information in a number of sets of image region modeling coefficients preceding the said set of image region modeling coefficients, for each of the preset scan orders a fit parameter for preceding sets of region modeling coefficients is calculated and the following set of image region modeling coefficients is encoded following one of the preset fixed scan orders in dependence on the calculated fit parameters for preceding sets of image region modeling coefficients.

Such embodiments require relatively little calculation power, since the choice is limited to a number of fixed scan orders. Known scan orders can be used for the preset scan orders.

It is remarked, in respect of the known techniques such as described in US 2003/0007698 and European Patent application EP 0 836 328, that, although in both instances use is made of fixed scan orders, the basic principle of the methods differ fundamentally. In the prior art methods the decision on the scan order is taken based on information in the set of image region modeling coefficients itself, and thus for each set of image region modeling coefficients information on the chosen scan order has to be transmitted with the encoded reordered set of image region modeling coefficients. Without such co-transmitted information the decoder would have no means to perform a reverse scan order on the reordered sets of image region modeling coefficients, since the information on the scan order used for encoding the set of image region modeling coefficients into a reordered set of image region modeling coefficients would be missing. In the method of the invention the scan order is determined based on the data in a number of preceding sets of image region modeling coefficients. These preceding sets of image region modeling coefficients have already been decoded in the decoder before the following set of image region modeling coefficients in question, and thus the decoder can determine the scan order used by the encoder based on the decoded reconstructed previous sets of set of image region modeling coefficients, and is thus capable of determining the reverse scan order to be used and can consequently decode the following set of image region modeling coefficients, without the need of transmission of further information.

The method as described in US 2003/0007698 and European Patent application EP 0 836 328 also inherently restricts the possible number of fixed scan orders. If the set of image region modeling coefficients are classified according to a limited number of fixed scan orders, the actual data in the block possibly does not truly fit any fixed scan order.

Increasing the number of classes to assign to any set of data the best possible scan order would on the one hand compress the data, but, on the other hand, given the fact that to any block a class number must be assigned and transmitted so that it may be correctly decoded, would increase the bits in the transmitted stream.

In the method of the invention this problem does not occur and a larger number of fixed scan orders may be used.

The limitation now becomes a different one: as the number of fixed scan orders used in the method of the invention increases, more computations have to be performed to calculate more fix parameters. However, this problem can be reduced by performing a coarse calculation to find among a larger number of fixed scan orders the relatively smaller number of scan orders for which it is likely that a good match can be found, and then refine the calculation for the scan orders for which a good coarse match is found.

A different preferred method embodiment is characterized in that common zero values are found in a number of preceding set of image region modeling coefficients. Such common zero values are then be "pushed backwards" in the scan order (i.e. the positions where zeroes often occur are at the end of the scan-path) or grouped. Such reordering to group zero values reduces the number of bits to be transmitted. Grouping can be of interest to run-length or other predictive encoding, by making the scan such that similar values are next to each other. They can then be e.g. encoded roughly—as if they were exactly the same—with a correction (e.g. separate).

In a preferred embodiment of the method of encoding the scan order is determined on the basis of statistical analysis of information of preceding sets of image region modeling coefficients.

Such a method allows more fine-tuning of the scan order.

In a preferred embodiment, wherein the set of image region modeling coefficients comprises a number of coefficients, the method of encoding, and the corresponding method of decoding is characterized in that for a part of the number of coefficients the scan order is determined, while for the remaining coefficients a fixed (e.g. zigzag over the remainder of the block) scan order is used, so that the scan-path is tuned mostly in response to lower frequency coefficients.

Within the framework of the invention, it is not necessary that the method is used to determine a best scan order for all coefficients of the sets of image region modeling coefficients. Often there are low order coefficients and high, higher and highest order coefficients, wherein the higher or highest order coefficients often have a value of zero or are relatively unimportant. The calculation power required may be reduced by only considering a part of the total number of coefficients and determining the scan order for said coefficients and taking a fixed scan order for the rest of the coefficients. In order for there to be a reasonable good prediction of the best scan order, there have to be enough information and in particular enough value of coefficients not being zero. Considering only the more important coefficients thus leads sooner to reliable statistical predictions.

In preferred embodiments of the invention the method comprises a step in which information pertaining to the algorithms used for the scan order determination (or parameters of the algorithms) is added to a signal comprising reordered sets of image region modeling coefficients.

Within the framework of the invention more or less complicated methods for scan order determination may be used in the encoder. By incorporating information pertaining to the algorithms used for the scan order determination in a signal comprising reordered sets of image region modeling coefficients the decoder is guided. Such information may be for the signal as a whole, for instance an indication of a type of algorithm used possibly followed by parameters, such as the number of preceding set of image region modeling coefficients considered. In its most simple form the information comprises an indication that a method in accordance with the invention is used. If a standard algorithm would be used for a certain type of signal it would be sufficient if the signal, for instance in a header, comprises the information that such a standard is used. The information may also be inserted into the signal at specific points or with a pointer to specific points within the signal to indicate transitions of one type of scan order determining algorithm to another type, or parameter changes within the use of one and the same algorithm or the information may even be the description of the algorithm itself.

The invention also relates to a signal comprising encoded reordered sets of image region modeling coefficients and information pertaining to the scan order determination algorithm used for encoding reordered sets of image region modeling coefficients.

The invention also relates to a signal comprising information pertaining to the scan order determination algorithm for encoding in accordance with the invention.

The information pertaining to the scan order determination algorithm used in or for a method in accordance with the invention may be comprised in a signal transmitted or stored separately from a signal comprising the sets of image region modeling coefficients encoded in accordance with the invention. The only thing that is required is that the two signals are recognizable as having a relationship. This may for instance be done by incorporating information into one or both of the signals allowing them to be coupled and/or synchronized.

The invention also relates to a storage medium on which such a signal is stored. A storage medium is any medium for storing data signals, such as for instance optical storage media such as CD's or DVD's, magnetic or electronic storage media, image storage media such as those used in camera's, hard discs, floppy disks, integrated circuits for storing data. A storage medium may also be a device having an integrated or inserted part, such as an IC or an insertable stick or disk or other storage facility in which the data is stored.

These and other objects of the invention will be apparent from and elucidated with reference to the embodiments described hereinafter.

In the drawings:

FIGS. 1 and 2 show basic principles of the invention;

FIGS. 3, 4, 5 and 6 schematically illustrate various choices for methods for scan order determination;

The figures are not drawn to scale. Generally, identical components are denoted by the same reference numerals in the figures.

Figure 1:
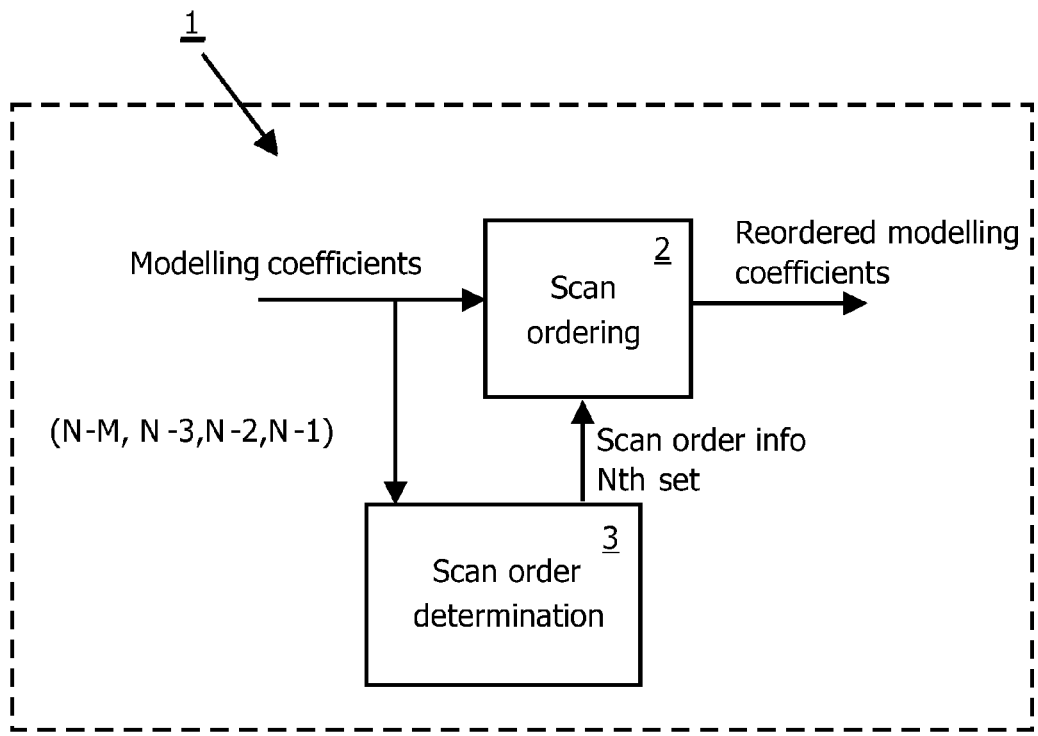

FIG. 1 shows schematically an encoding method and an encoder 1. In this and following figures "image region modeling coefficients" are indicated by the words "modeling coefficients". In the figures method steps within a method of encoding and corresponding parts of or within an encoder are for simplicity indicated by the same reference numeral. The same applies for pictures depicting decoding methods and decoders. The encoding method comprises a method step 2 wherein sets of image region modeling coefficients are scanned according to a scan order, herein below called "scan ordering", to be encoded into reordered sets of image region modeling coefficients. The encoder of the invention comprises a scan orderer 2 to perform the scan ordering method step. When, within the framework of the invention "scan orderer", "determinator" etc are used, it is remarked that such words are not to be interpreted in a restricted manner but cover, unless otherwise specified, any piece of hard-ware, firm-ware or software, including computer program codes, for performing the action of scan ordering, scan order determination etc. Herein below, for clarity purposes, various different method steps and corresponding parts or details of encoder and decoders are represented by separate blocks. In practice they may be part of a single complex algorithm. It is remarked that the invention is also embodied in computer codes and computer programs for performing a method of encoding or decoding in accordance with the invention when used in computer as well as in any storage medium comprising such computer codes or programs.

The method of encoding comprises a method step 3 in which the scan order is determined. Such a method step is herein below also called 'scan order determination'. The encoder of the invention comprises a scan order determinator 3 to perform such a method step.

Figure 2:
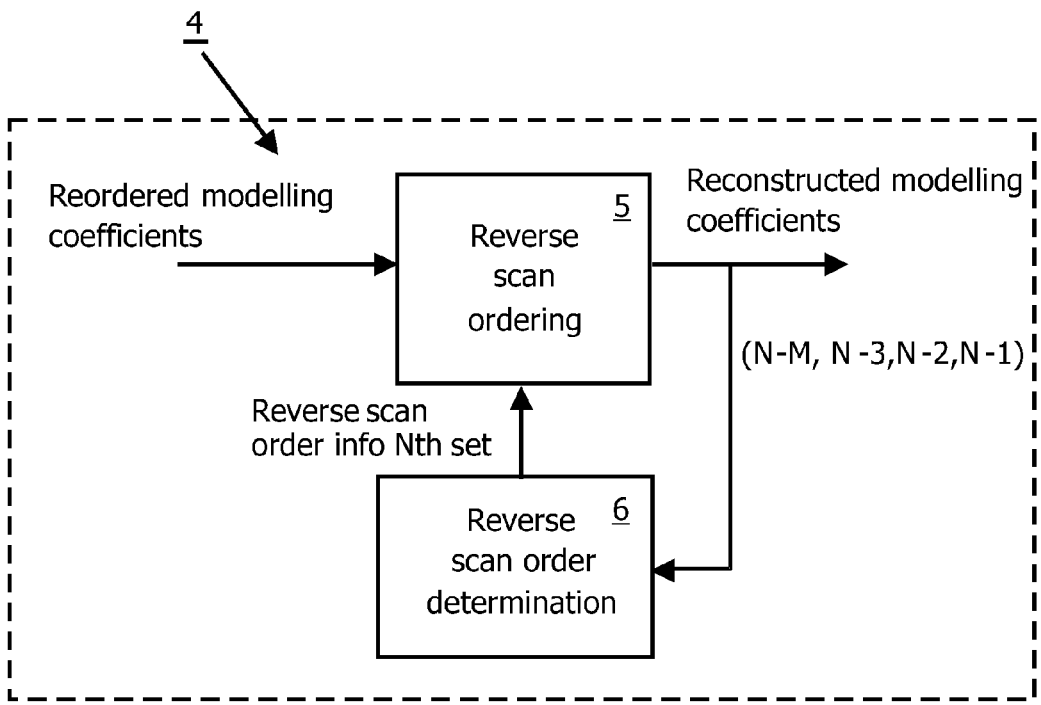

The decoder 4, see FIG. 2, comprises a part 5 to apply a reverse scan ordering and a part 6 to determine a reverse scan order.

To determine the scan order for an Nth set of image region modeling coefficients information on a number of preceding sets of image region modeling coefficients, in FIGS. 1 and 2 indicated by (N−M, N−3, N−2, N−1), is provided to scan order determinator 3. Based on this information scan order determinator 3 determines the scan order for the following Nth sets of image region modeling coefficients. The particular scan order follows from the used algorithm and thus there is no need to transmit the particular scan order with the Nth set of image region modeling coefficients. Scan order information on the scan order for the following Nth set of image region modeling coefficients is communicated to the scan ordered 2. At the decoder side, see FIG. 2, the reverse process is done, the information of previously decoded, reconstructed, sets of image region modeling coefficients (N−M, N−3, N−2, N−1) is lead to a reverse scan order determinator 6. The reverse scan order determinator 6 determines a reverse scan order which reverse scan orders follows or is comparable to the scan order used in the encoder for the following Nth set of image region modeling coefficients and applies the reverse scan order is applied in reverse scan orderer 5 tot the Nth set.

It is remarked that preferably the same algorithm is used in scan order determinator 3 and reverse scan order determinator 6. However, this is not absolutely necessary within the broadest framework of the invention. The encoder 1 may use a more sophisticated algorithm than the decoder 4. For instance, for image reproduction in which use is made of DCT blocks having 64 coefficients, the encoder may determine the best scan order for all of the 64 coefficients, whereas in the decoder the scan order may be determined for a smaller number of coefficients. The more complicated the algorithm used, the higher the costs. It may make sense to use a complicated high quality algorithm for the encoder, even though use of such an algorithm may be costly, since it is not a priori known by which device the bit stream will be received. The transmitted bit stream may be received by a receiver having a large high quality image device, or a receiver having a small, low quality image device. Although a difference in the used algorithm may introduce errors in the reproduced image, in this case in some of the higher order coefficients, if the decoder decodes the image for or in an image display device (for instance in a small mobile phone) for which the image size and image quality is so small that such introduced image errors are not visible anyway, there is possibly no need to use an algorithm as complex as the one used in the encoder, and money can be saved.

Figure 6:
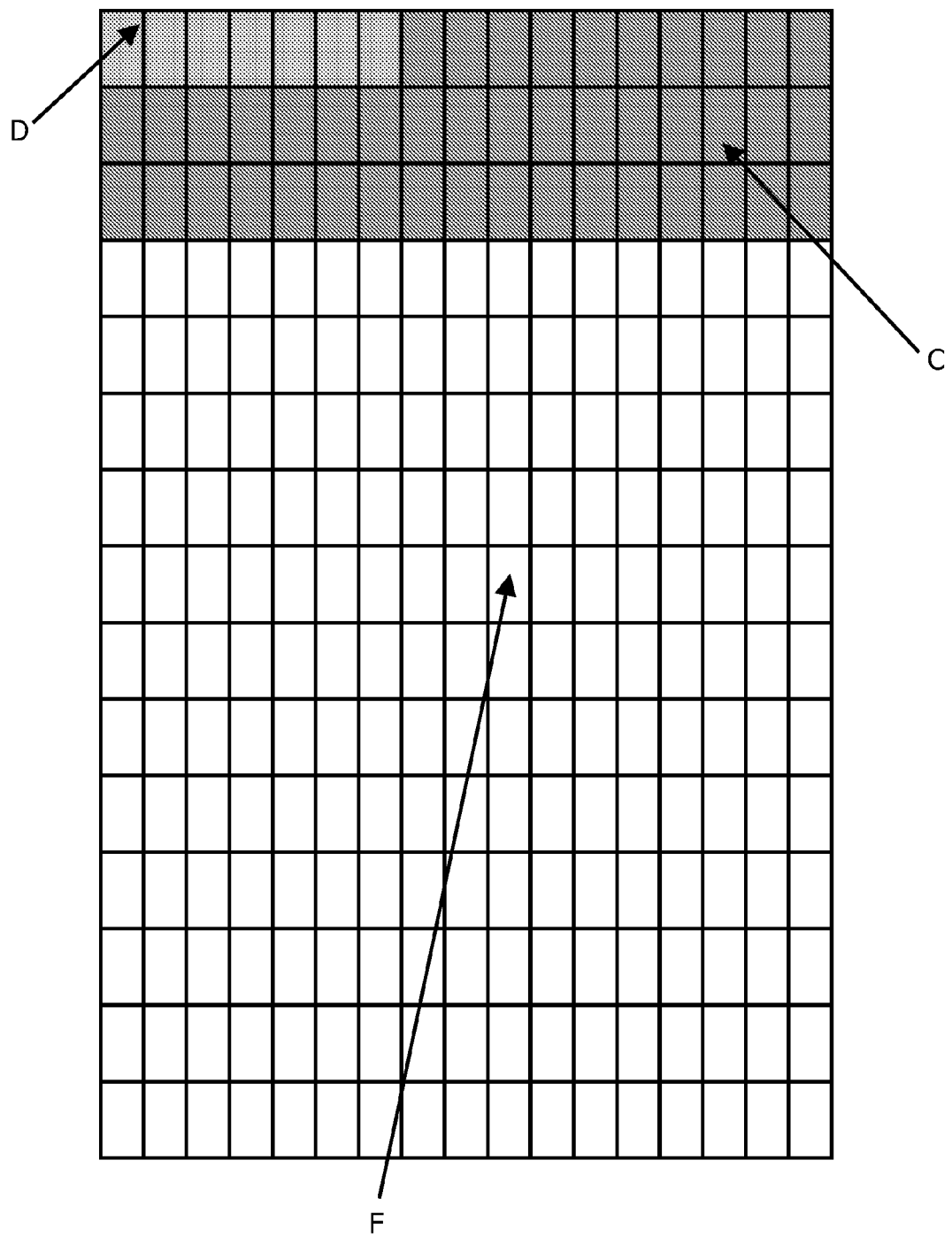

An example of the use of different algorithms in encoder and decoder is given below in respect of FIGS. 5 and 6.

Figure 3:
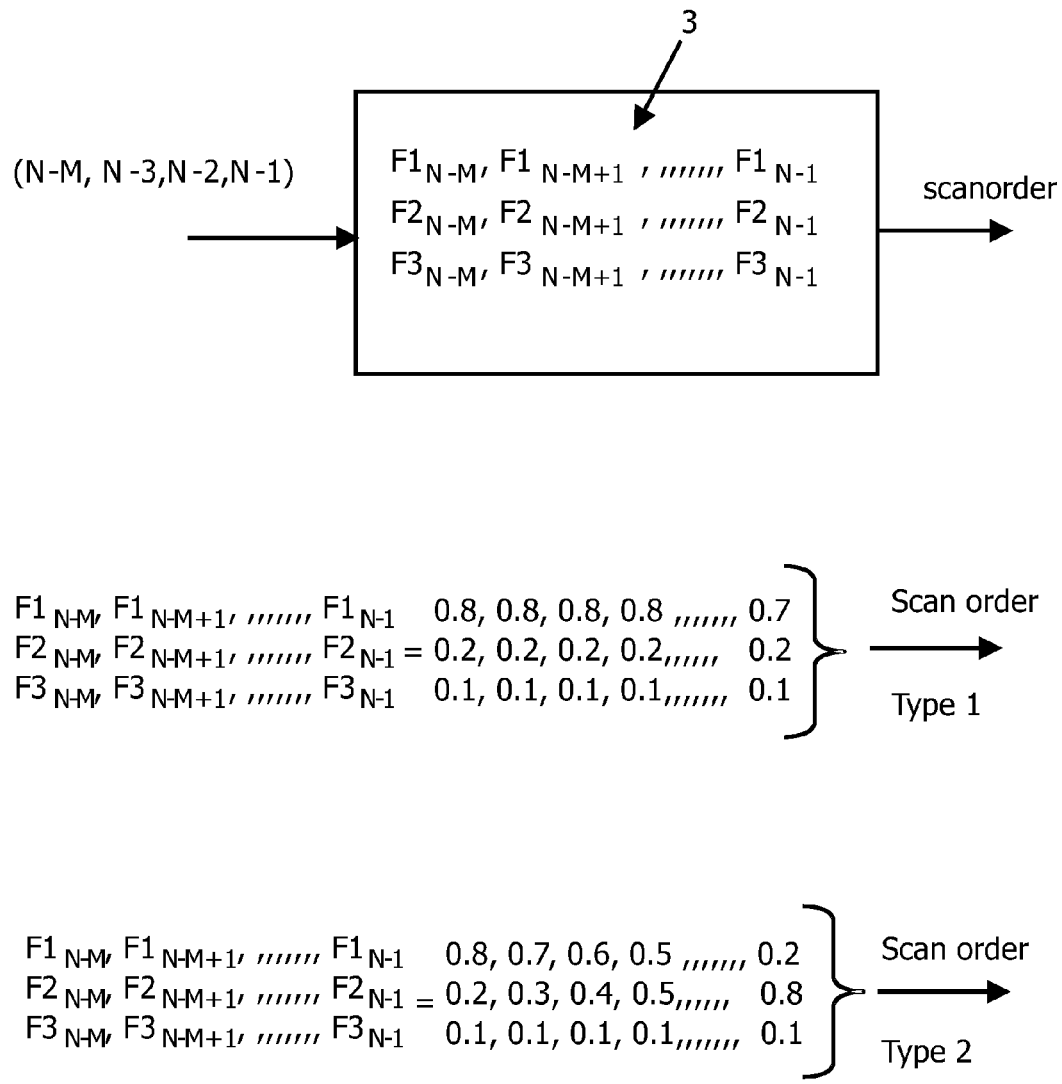

FIG. 3 schematically illustrates one possible type of method for determination of scan order. In this example a number of fixed scan orders is used. For each of the previous sets of image region modeling coefficients a fit parameter $F1_{N-M}$, $F1_{N-M+1}$ etc is calculated in scan order determinator 3. $F1_{N-M}$ stands for the fit parameter of the (N−M)th set of image region modeling coefficients to a fixed scan order, in this case scan F1, which e.g. first scans some low frequency horizontal coefficients (corresponding to such structure in the image region, e.g. comprising a building) and then jumps to mid-frequency coefficients (comprising a lot of energy because there are e.g. plants hanging on the building, or smaller scale brick textures). Such a fit parameter may for instance be calculated by arranging the coefficients of a DCT block on decreasing value, and then comparing this order to the scan order of various fixed scan and calculating how many of the coefficients have to be transmitted, or how many bits have to be transmitted using each of the fixed scan orders before a certain percentage of the total information or the total information is transmitted (i.e. for various cut-offs of the scan, or just taking the variable length coding savings into account for parts of or entire scan). The square of the magnitude of the coefficient is one of the possible measures of the energy transmitted (and also how well the underlying image signal is hence modeled). Other fit measures can work purely geometrically on the scan pattern similarity itself rather than the coefficient values, e.g. comparing the ordered coefficients with the present block with those of a particular scan path, and checking how many coincide, possibly taking into account small differences in location and their impact on number of bits required and/or reconstruction quality. In any case the fit measure outcome determines how well a particular scan pattern compresses (certain number of bits for certain quality) for a particular previous block, and therefrom e.g. an average fit over previous blocks for all scan paths can be determined, or another statistic such as the mode, or a representative of relatively low transmission cost. Non-linear operations can be applied, categorizing the fits e.g. in classes.

In the first example it is, for the sake of argument, assumed a value of the fit parameters F is taken to be 1 if the fit is perfect (as a normalizer e.g. a function of an average expected bit cost, e.g. over previous images of a sequence may be used, or just a very large value, since the relative order is important) and 0 for a very bad fit. In the first example it is seen that the top row indicates that the fit parameter F for preceding sets of image region modeling coefficients is high for a first fixed scan order, while for other fixed scan orders the fit parameter F is low. The 'best' fixed scan order for the next set of image region modeling coefficients is then type 1.

In the second example it is seen that the fit parameter F for a first type of fixed scan order is steadily decreasing, while the fit to a second type (second row) of fixed scan order is steadily increasing. The 'best' fixed scan order for the next set of image region modeling coefficients is then type 2.

Figure 4:
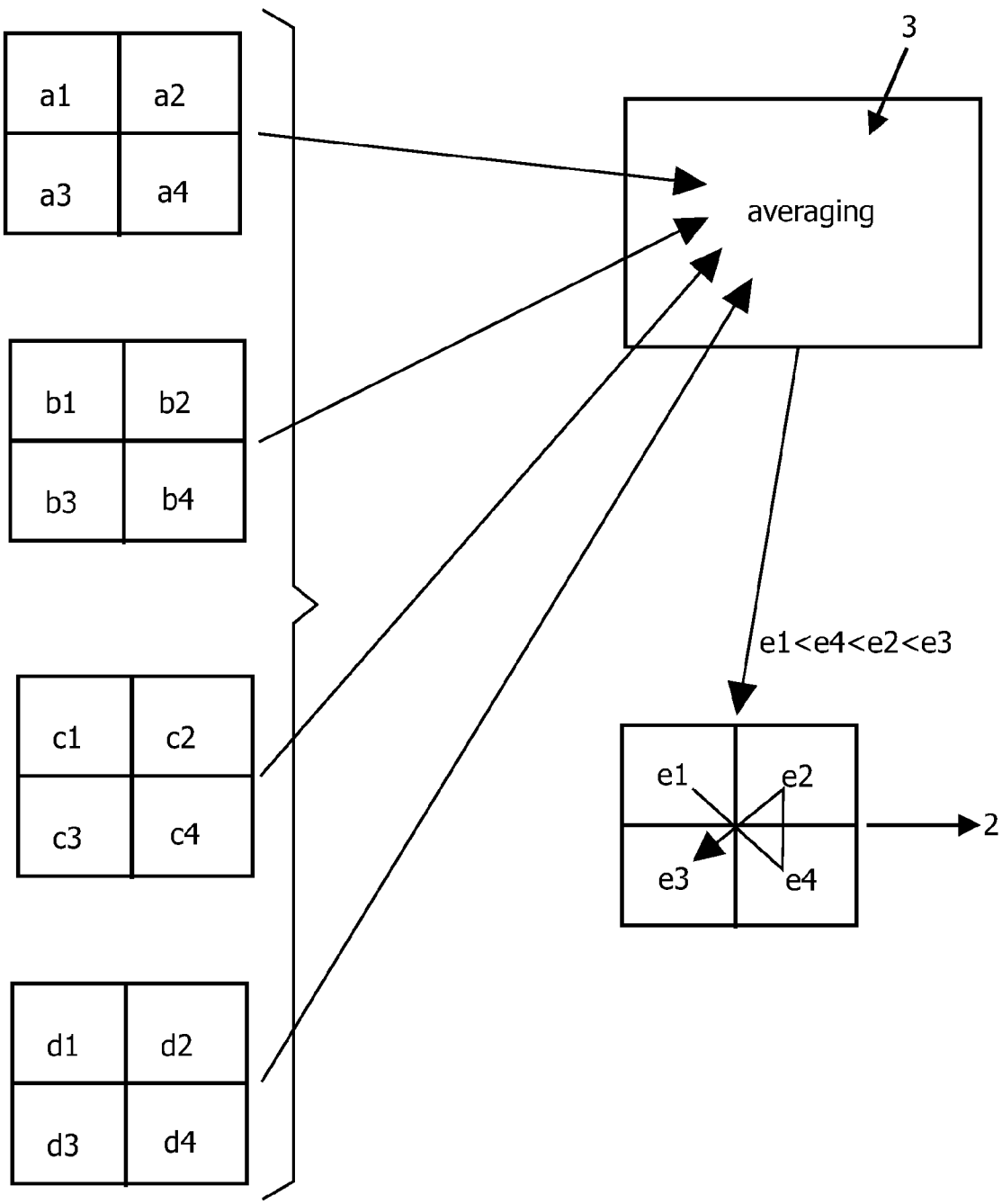

FIG. 4 illustrates a different kind of algorithm for on-the-fly determination of a good scan path. In this simplified example four blocks of coefficients (a1 to a4, b1 to b4, c1 to c4, d1 to d4) are averaged, i.e. average values e1, e2, e3 and e4 are calculated by summing corresponding coefficients in previous blocks and dividing the sum by four.

It is then found that e1<e4<e2<e3 and the scan order is determined to be e1-e4-e2-e3.

Having the larger coefficients first, increases e.g. the probability of long runs of zeroes ending in short codes later on. A different optimal regrouping strategy can be designed for different variable length coding strategies. This information is sent to scan orderer 2 which reorders the following Nth set of image region modeling coefficients in accordance with this scan order. It is remarked that the information on the scan order need not be the scan order itself, information enabling the scan orderer 2 to know the to be applied scan order suffices (e.g. a description number). Such information could be for instance the indication that no change is to be made or a specific change is to be made.

This principle may be expanded to any number of coefficients. It is remarked that for all embodiments it is not obligatory that a 'prefect fit' or 'perfect solution' is found, a change in scan order need only provide on average an improvement or advantage or change. E.g. although for a certain region of the image, the encoding with the current scan-path becomes worse, the encoder may based on statistical analysis (because it has previously encountered relatively short runs of bad scan path encoding, or it may even model them geometrically, as they may all belong to a tree region covering the sky e.g.) decide to still use the present scan path, instead of perhaps a better locally optimized one.

Figure 5:
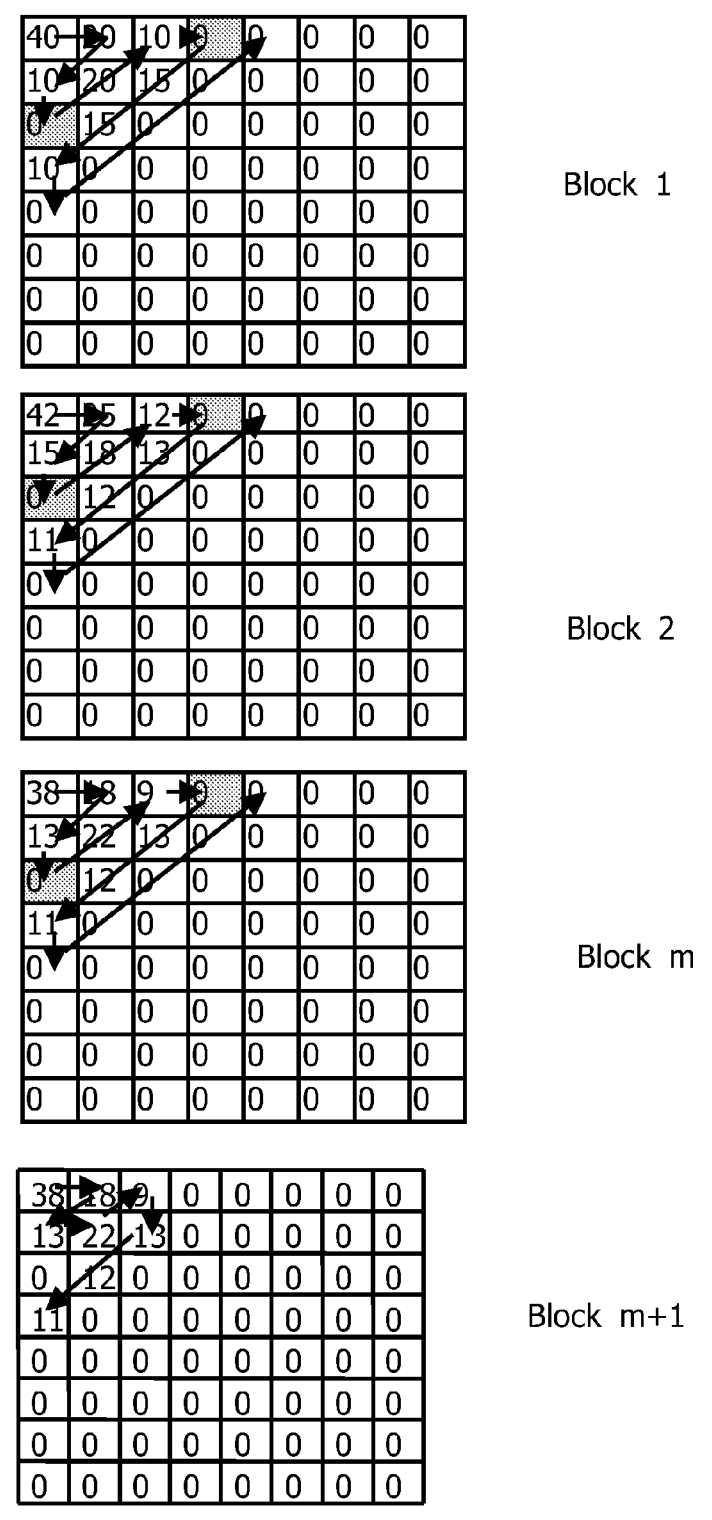

Yet a further kind of algorithm is illustrated in FIG. 5. Four blocks of DCT coefficients are shown. These blocks are all scanned in accordance with a zigzag scan. On close inspection it is apparent that for each of these three blocks some of the coefficients early in the scan order, namely the fourth and seventh coefficients, are zero (or have very low values). These coefficients are indicated by grey rectangles. In block m+1 use is made of this gathered information: The scan order is changed so that these zero value coefficients are pushed back in the scan order (to where they could e.g. be skipped). This is a relatively simple algorithm which does not require many preceding sets of image region modeling coefficients to be analyzed.

Thus, within the framework of the invention, several algorithms may be used in a method or device in accordance with the invention, all of which, however, have the same common idea: The scan order for a set of image region modeling coefficients is determined on basis of information on preceding sets of image region modeling coefficients.

Within the framework of the invention it is not obligatory that one and the same algorithm for determining a good locally adaptive scan path is used for all sets of image region modeling coefficients. FIG. 6 schematically illustrates blocks in pixel domain for an image. For the first few blocks a default scan order is used. This is schematically indicated by light grey blocks and the letter D. For these sets of image region modeling coefficients there is not enough information to make for reliable statistics so that a default scan order, for instance a zigzag scan order, is used. As more blocks are encoded more information becomes available allowing a relatively coarse algorithm to be used (e.g. only averaging over very few blocks, and only switching from zigzag if really much savings can be made due to attuning to predominant local image structure). Such algorithms do not need much statistical information, but their range is limited, such may be for instance an algorithm in which only a small number of fixed scan orders is used, or in which only the coefficients which are zero for small sequences of set of image region modeling coefficients are pushed back or grouped since using VLC coding such reordering reduces the number of bits needed. As more and more blocks are encoded the statistical information on the various image regions modeling coefficients becomes more and more reliable and a more sophisticated algorithm may be used, for instance one in which the average of a large number of coefficients is calculated. In FIG. 6 this is illustrates by white blocks and the letter F for full scale. The invention is not restricted to a particular type of coding (Huffman, arithmetic, . . . ) performed after scan ordering. However, the scan ordering as performed may be dependent on method steps preceding or following the scan ordering.

Figure 7:
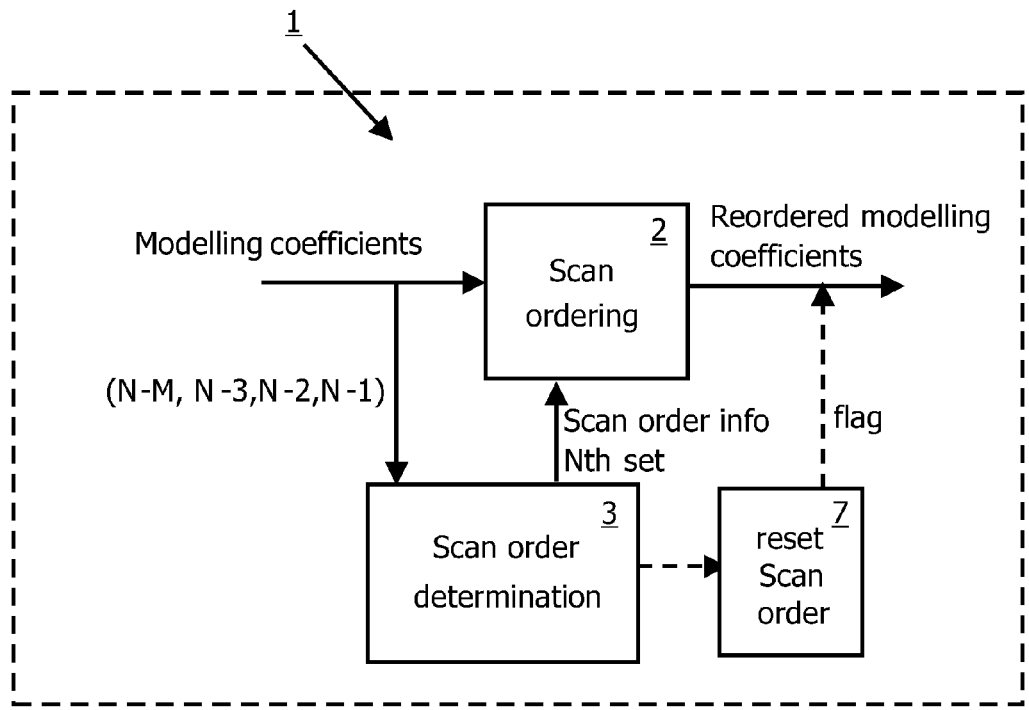
FIGS. 7 and 8 illustrate a further embodiment of the methods and devices in accordance with the invention.
Figure 8:
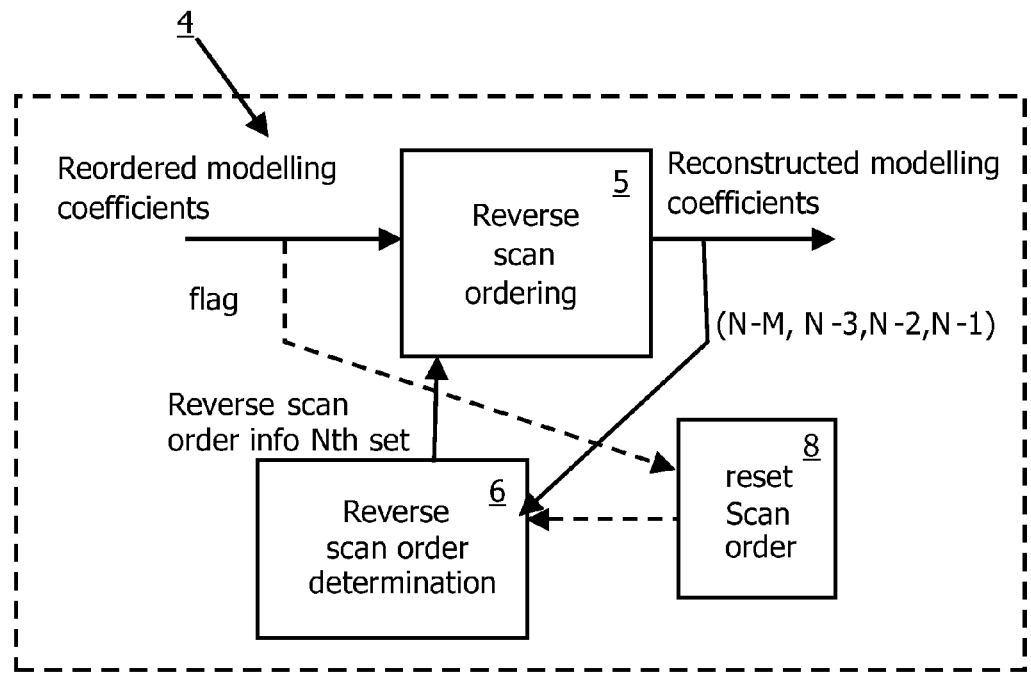

FIGS. 7 and 8 illustrate a further embodiment of the invention.

The invention is based on the insight that a reasonably good prediction may be made for the best or at least a good scan order of a set of image region modeling coefficients based on information of preceding sets of image region modeling coefficients. However, in circumstances this may not be the case. For instance at sudden changes in an image, the predictive value may be low at best. To put it in other words, the statistics may break down. In preferred embodiments the method of encoding comprises a step in which a reset scan order is used and to the set of image region modeling coefficients a flag is assigned. At the decoder the flag triggers a reset inverse scan order to be used. It is remarked that in this example the algorithms at the encoder and decoder side differ in the fact that at the encoder side the algorithm has a means for detecting when the statistical information is no longer reliable and assigning a flag to the set of image region modeling coefficients, at the decoder side the situation is much simpler, all that is needed is to detect the flag. The reset may be to a standard scan order, e.g. zigzag, or may be to a scan order used for any preceding block. For instance when a tree is present in a piece of sky, it is advantageous to reset the scan order for blocks following the region of the tree to the scan order previously used for the piece of sky (this avoids statistical start-up problems). This scan order is already used and thus known. Depending on the reset, the flag may comprise different information. The flag may also indicate that the scan order is to be made the best "average scan order" for the whole of the image, if such a best average scan order is predetermined. It may also indicate regions of interest, for instance regions within an image for which standard zigzag scanning is used. It may comprise information on the type of algorithm used to determine the new scan, e.g. the number of previous blocks to take into account in the statistical analysis. The encoder has the possibility to optimize this with a multi-pass encoding of the local region.

A further example of using a flag, i.e. providing information pertaining to the used scanning algorithm, e.g. by providing a dedicated information field in the signal, is the following:

Different parts of an image may prima facie, when not taking into consideration color, superficially have the same type of texture. For instance plants, as well as a face, may have a certain coarseness and line structure. However, many errors in reproduction of an image of plants will hardly be noticed by the viewer since any region of plants looks the same as any other. However the same type of errors in the reproduction of a face, especially a familiar face, may be very annoying since in human perception face recognition and true to life facial image reproduction is very important, much more than the accurate reproduction of plants or sky. Using a flesh color recognition scheme it is possible to recognize parts of an image that portray a human face (or at least a part of a human). Within the concept of the invention, in a preferred embodiment for e.g. a human face a different algorithm is used or different parameters for the used algorithm. A small number of blocks may be sufficient to know that a human face is portrayed. The scan order determinator then switches to an algorithm suitable for a human face and places a flag in the encoded signal indicating such a switch in algorithm. This flag enables the decoder to implement the same or a comparable switch in algorithm even though the decoder does not have program codes to execute a flesh color recognition scheme. After a certain number of blocks an image transition may be present from a human face to background, e.g. sky. Using the flesh color recognition scheme the encoder recognizes that the next block or the following blocks no longer form part of a human face and the scan order determinator returns to a different kind of algorithm, for instance back to a previously used algorithm and a flag is inserted into the signal allowing the decoder to make the same switch. The same could be done for instance sky or grass image parts. The algorithm or its parameters may thus, within preferred embodiments in which for an image of for a series of image different algorithms or different parameters for the algorithm are used, be region dependent so that in embodiments a distinction is made between regions, for instance the center region and edge regions of an image, using different algorithm or parameters dependent on the region, and/or may be object content dependent as explained above with respect to faces, grass, sky etc. The switch may be to a completely different type of algorithm or amount to a change in parameters within a used algorithm.

Figure 9:
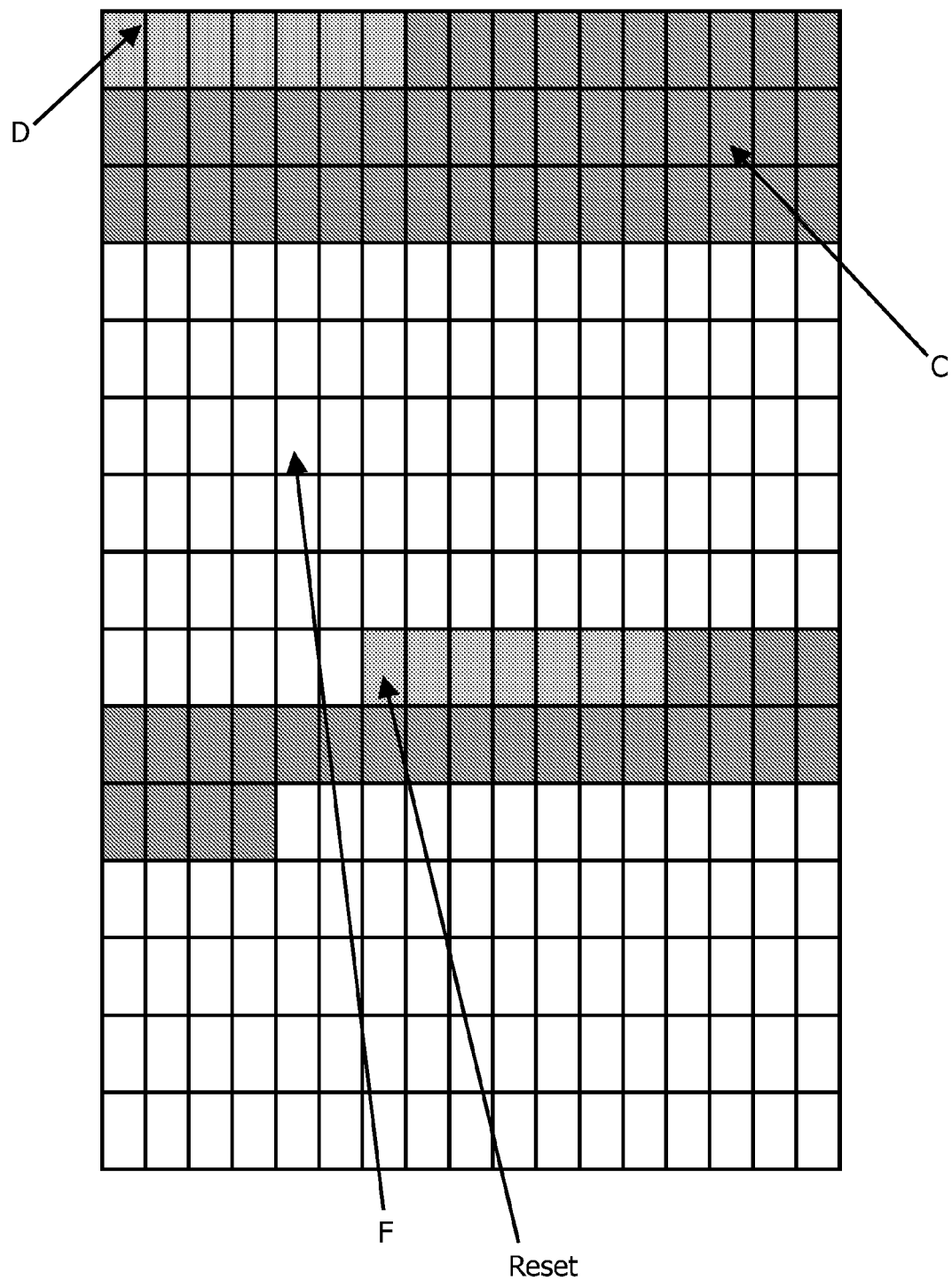
FIGS. 9, 10, 11 and 12 illustrate various choices for methods for scan order determination.

FIG. 9 illustrates a sequence of image blocks within an image. The difference with FIG. 6 is that for a block approximately in the middle of the page the scan order is reset or changed, in this case to standard scan order, where after for some blocks a standard scan order D is used, where after a coarse algorithm C is used, followed by using a full scale algorithm F.

Figure 10:
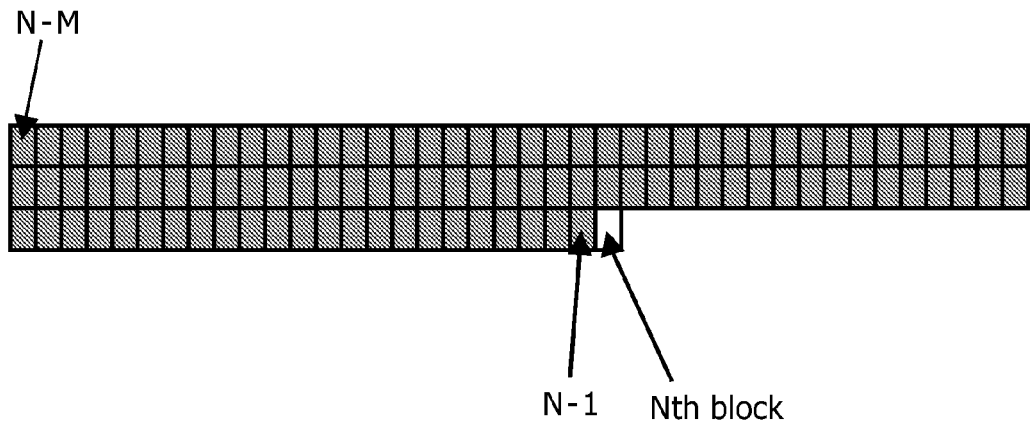
Figure 11:
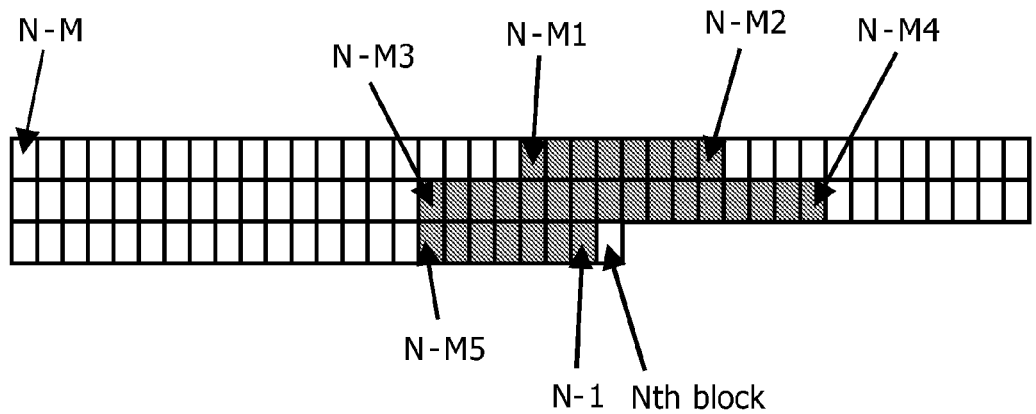

FIGS. 10 and 11 illustrate various ways of using information of preceding set of image region modeling coefficients, in this figure called blocks, for determination of the scan order of a following set of image region modeling coefficients.

In a simple arrangement as given in FIG. 10 information of all blocks up to N–M blocks preceding the Nth block is used. It may, however, be more efficient to restrict the information gathering to those preceding blocks that correspond to neighboring blocks, in space and/or in time. E.g. motion detection may be used to adaptively determine the amount of blocks for the statistical analysis to the size of coherently moving objects. FIG. 11 shows than for an Nth block the information of a number of neighboring blocks is used.

Figure 12:
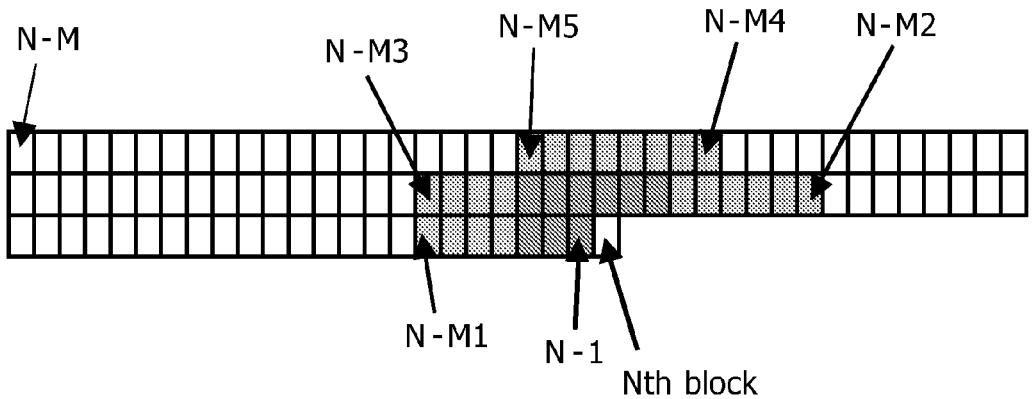

An example of a somewhat more elaborate method is schematically illustrated in FIG. 12. A weight factor may be given to those preceding blocks that are used in the scan order determination wherein the weight decreases as the block is more remote from the block for which the scan order is determined.

As an example:

For a DCT block having coefficients $a_{ij}$ the average coefficient $a_{ij}$ for an Nth block is calculated by taking the average over M preceding blocks $$\bar{a}_{i,j} = 1/M \Sigma a_{ij}$$

wherein the sum is taken over all M preceding blocks

In FIG. 11 the sum is taken over the blocks between and including N–M1 to N–M2, N–M3 to N–M4 and between N–M5 and N–1.

In FIG. 12 the average is taken as $$\bar{a}_{i,j} = 1/(M1-M2+1+M3-M4+1+M5) \Sigma W_B a_{ij}$$

wherein $W_B$ stands for the weight factor of the block in question. This weight factor decreases as the block is more remote from the Nth block. Of course weight factors can also be introduced in the formula where the sum is taken over all blocks between N–M and N–1. The weight factor may be only related to the distance in time or position between blocks, but could also or in addition be dependent on the content of a block itself. A block which comprises a forward or backward slanting edge, which can be deduced from the content of the block, could be given a higher weight factor for a following block in the line of the slanting edge than for a block away from the slanting edge even though the distance to said following blocks would be the same. When, within the method in accordance with the invention, blocks are used of previous images and for such blocks motion indicators are available, such motion indicators are in preferred embodiments used in determining the blocks to be included in the calculations and/or the weights of blocks to be included in the calculation.

In general some type of statistical analysis is performed. In the above example averages are calculated, but within the broader concept of the invention other types of statistical analysis may be used.

E.g. the coefficients may be grouped into several classes of higher and lower values. A scan-path variation from a previous block to a next may be classified as unchanged as long as it stays within a certain class. Scan path variations may also be judged depending on how many coefficients of the previous scan path (later part) now fall additionally within a certain part of the current scan path (leading to a bit overhead) and preferably also taking into account the importance of these coefficients, e.g. their power. The statistics may also be constrained taking into account psycho visual principles, e.g. variations in scan path (or statistical measures of coefficients over successive sets leading to scan paths) may be weighed more severely if they happen in the lower frequencies rather than in the "noisy" higher frequencies.

The coefficients may be grouped in a number of clusters, to take into account texture attributes within regions and/or blocks. Similarly coefficients may be spread over neighboring coefficients, to take into account the deficiencies of the modeling, before a local coefficient landscape is determined.

Variances on the coding efficiencies of different scan paths can be taken into account to judge specific/generic suitability.

Also some coefficient values (at certain positions) or some mismatching scans may be disregarded as outliers in the statistics, or their effect on the path (which may be formulated as a cost integral) may be analyzed, etc.

Figure 13:
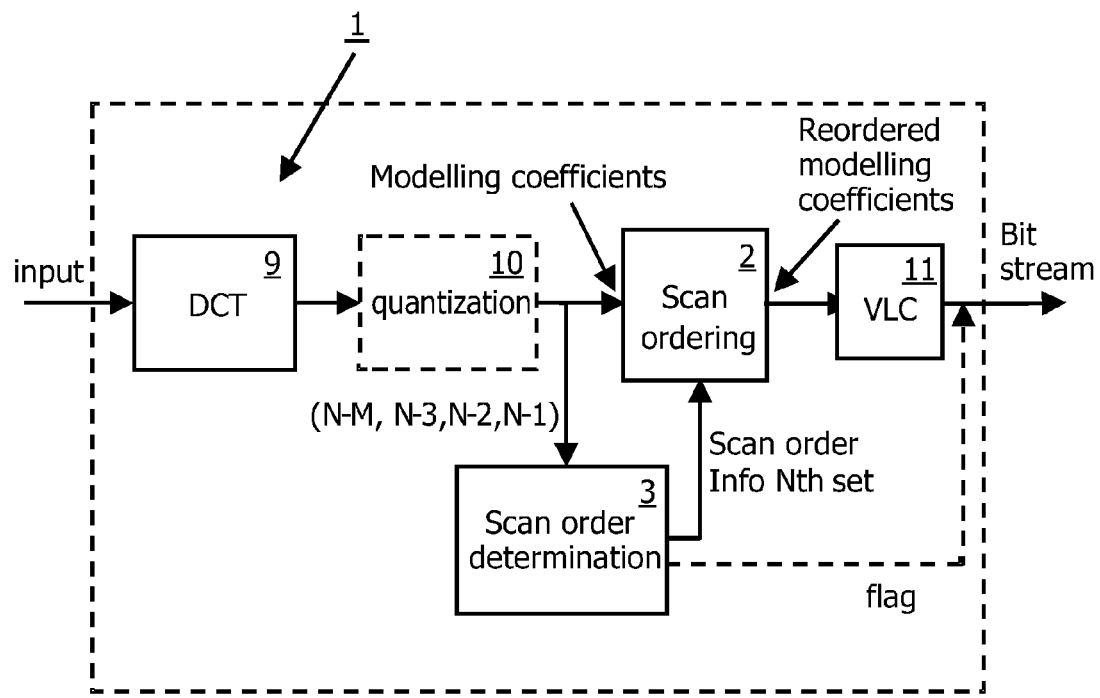
FIGS. 13 and 14 illustrate a method for encoding and decoding and an encoder and a decoder wherein pixels are encoded and decoded.
Figure 14:
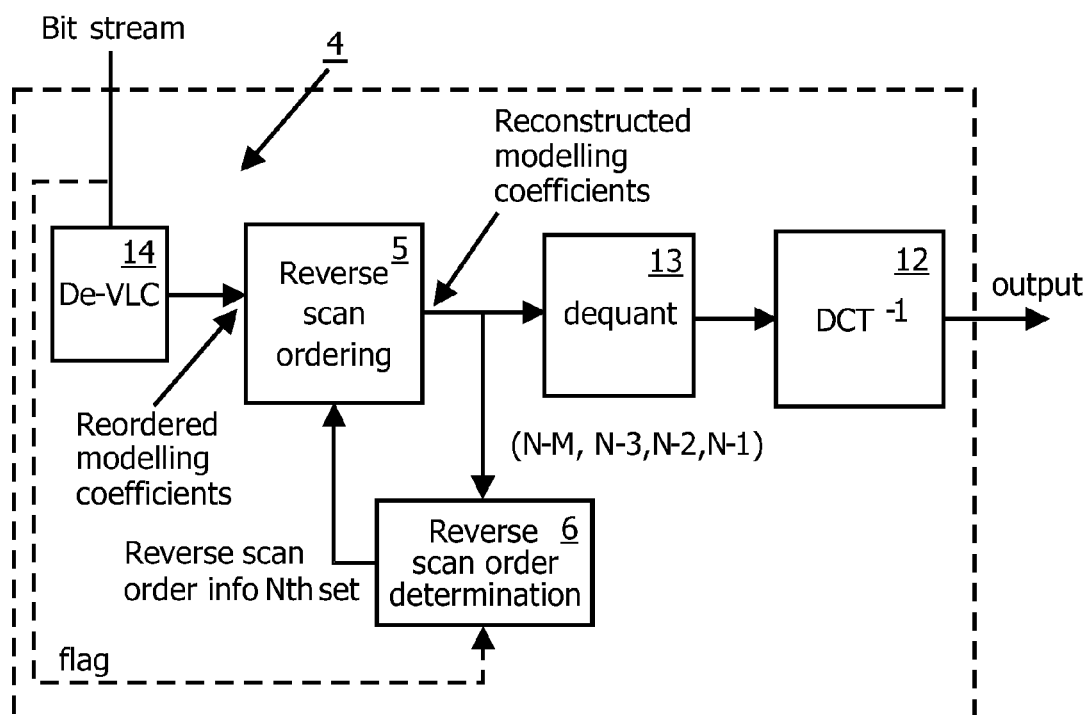

FIGS. 13 and 14 illustrate an encoder and decoder for encoding and decoding image information. The input blocks of pixels in the spatial domain are transformed in blocks of coefficients in a transform domain, in part 9, in this example in DCT (discrete cosine transform) coefficients, although other types of coefficients (wavelet, Hadamard) could also be used within the framework of the invention. The DCT coefficients are quantized, in part 10, and subsequently scan ordered. The scan order determinator receives the quantized DCT coefficients and calculates the scan order for the Nth block. In the scan ordering step the quantized DCT coefficients are ordered and a signal e.g. in the form of a bit stream is provided by means of a VLC (Variable Length Coding) operation in part 11. The reverse process is done at the decoder, see FIG. 13. The decoder performs a reverse DCT operation (part 12), a reverse quantization (part 13) and a reverse VLC operation (part 14). Experiments have shown that, compared to using one and the same scan order gains in a reduction of bit rate using the present invention of in the order of 8 to 15% are possible using a relatively simple model in which the average coefficients, without weighting factors were calculated taking N–M to be 512, which corresponds to 5-6 lines in an image. FIGS. 13 and 14 also illustrate an aspect of a preferred embodiment. Information on the used algorithm in the scan order determinator which may be general information such as the type of algorithm used, as well as parameter information is added to the bit stream, e.g. in a header. This information is picked up at the decoder sides and used in the scan order determinator at the decoder side. Schematically this is indicated in FIGS. 13 and 14 by the dotted lines originating from part 3, respectively going to part 6 and the word flag next to the dotted lines.

Figure 15:
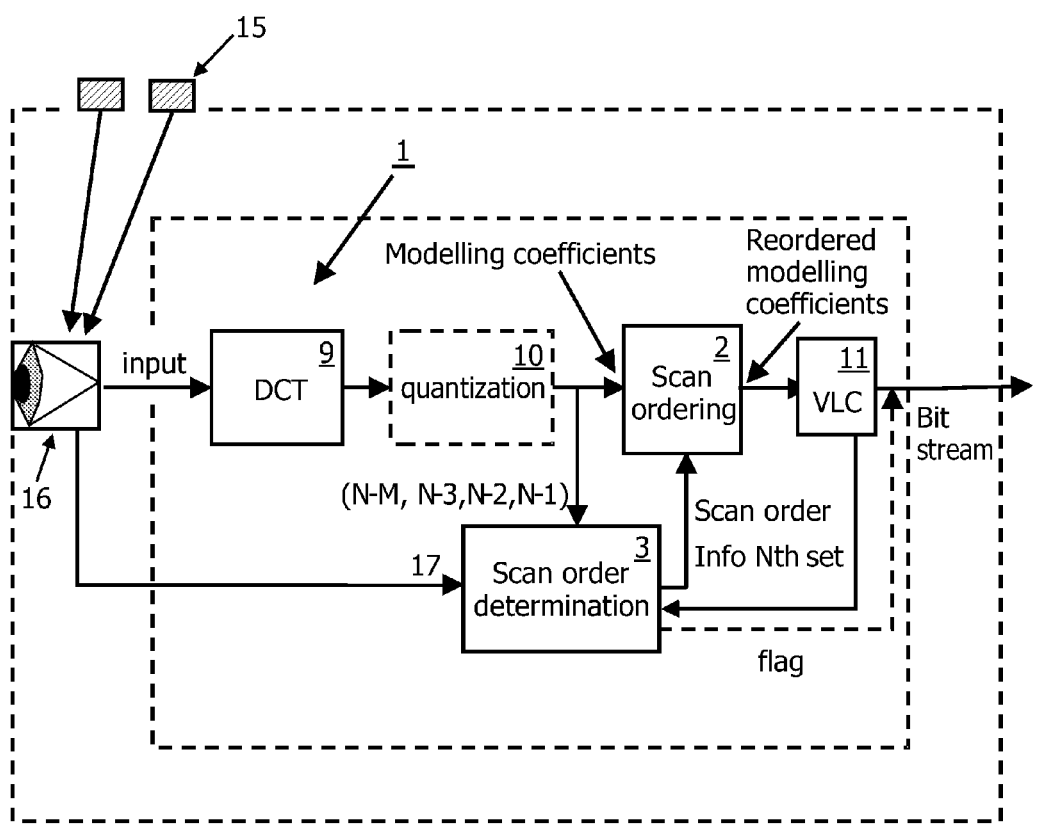
FIG. 15 illustrates a further embodiment of the invention.

FIG. 15 illustrates embodiments of the invention in which the parameters of the scan ordering are dependent on method steps preceding the scan ordering. In a device having a image-capturing means, for instance a camera 16, setting means 15 are provided, for instance a dial or knobs with which the setting of the camera can be controlled. An output stream of the recording device is an input for the encoder 1. The settings of the recording device are communicated e.g. via a line 17 to the scan order determinator 3. For instance, the number M of previous blocks to be considered in determining the scan order for the Nth block may be different for different settings of the camera. For a coarse setting of low resolution for the camera 16 the number M of preceding sets of image region modeling coefficients to be used in the scan order determinator 3 may be set to a relatively small number, while for a setting of high resolution for the camera 16 the number M may be set high. Therefore parameters used in the scan order determination, such as number of preceding set of image region modeling coefficients to be taken into consideration, selection of preceding sets of image region modeling coefficients to be taken into consideration, weight factors assigned to preceding sets of image region modeling coefficients to be taken into consideration, or more in general parameters for the algorithm or algorithms used in the scan order determination or determinator and/or the manner of taking preceding set of image region modeling coefficients into consideration, e.g. the algorithm or algorithms used in the scan order determination or determinator are, in preferred embodiments, dependent on parameters or settings of or for method steps or devices preceding the scan order determination step or scan order determinator. In the preferred example shown in FIG. 15 the scan order determination is dependent on characteristics of the image-capturing device or image-capturing process. FIG. 15 illustrates also, by means of the line going from the VLC 11 to the scan order determinator 3 that, in preferred embodiments, the parameters and or algorithms used in scan order determination and scan order determinator 3 are dependent on parameters of or characteristics of steps or devices following the scan ordering. Different coding techniques may be used to code the scan order reordered sets of image region modeling coefficients. VLC (Variable length coding) as schematically indicated in the figures is one such technique, but other techniques are known to a person skilled in the art. The "best choice" for the scan order may be dependent on the specific method used or parameters used in such specific method following the scan ordering 2.

Figure 16:
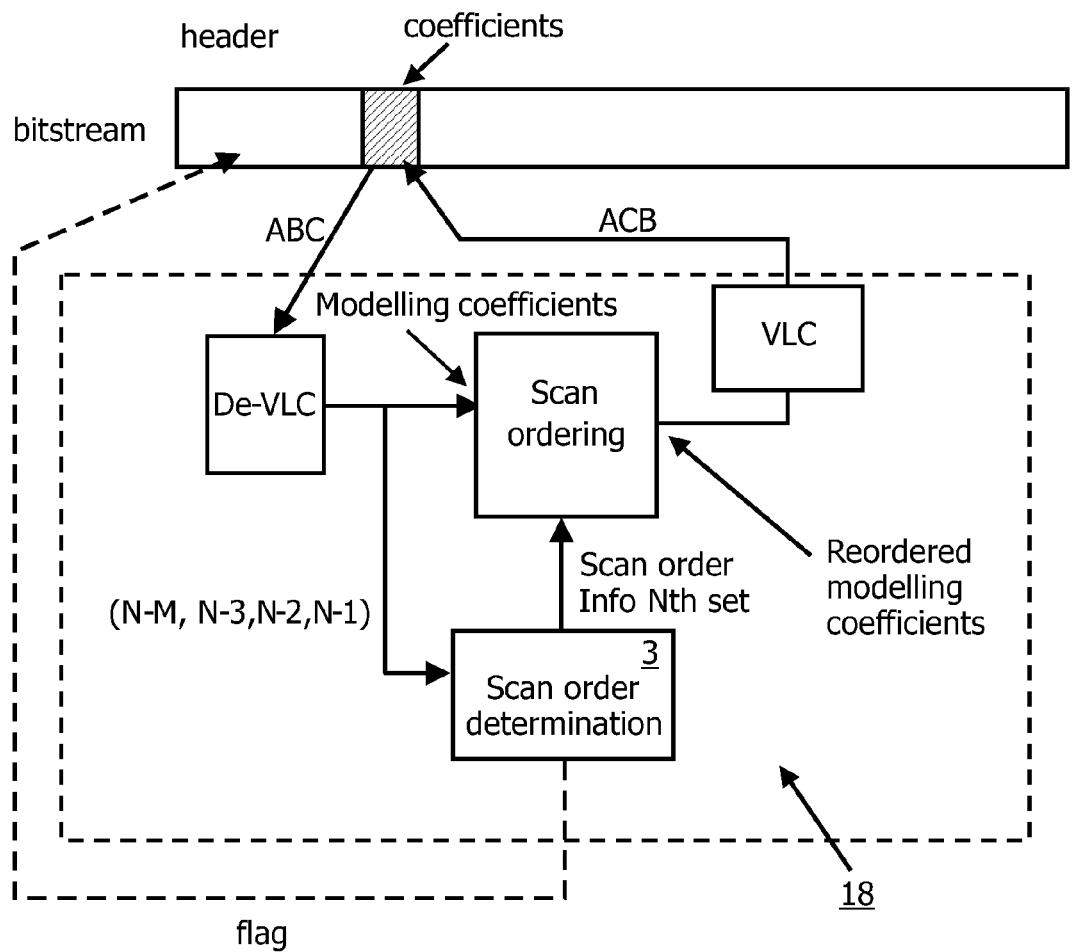
FIGS. 16 and 17 illustrate an encoder respectively a decoder of the invention in the form of a transcoder.

Within the concept of the invention "encoding" and "encoder" comprises each method and device in which the steps of the invention are undertaken as schematically illustrated in the figures. Likewise "decoding" and "decoder" comprise each method and device is which the steps of the invention are undertaken as schematically illustrated in the figures. A transcoder may thus, within the concept of the invention, be a specific type of encoder and transcoding is a type of encoding. FIG. 16 illustrates a transcoder 18 for transcoding coefficients, schematically indicated in a bitstream by ABC. This may be for instance a standard or known bitstream format. The coefficients undergo a reverse VLC method step (sometimes also called VLD, variable length decoding). This provides for sets of image region modeling coefficients. The sets of image region modeling coefficients then undergo an encoding in accordance with the invention to reordered sets of image region modeling coefficients, which reordered sets of image region modeling coefficients then undergo a VLC, variable length coding step, to becoming coefficients ACB which are then inserted into the bitstream in replacement of the original coefficients ABC. Thus a transcoding of data has taken place. Information on the used scan order determination may be placed in the header of the bitstream.

A transcoder which transcodes a bitstream encoded by a method or encoder in accordance with the invention into a standard bitstream format or any other format is within the framework of the invention.

Figure 17:
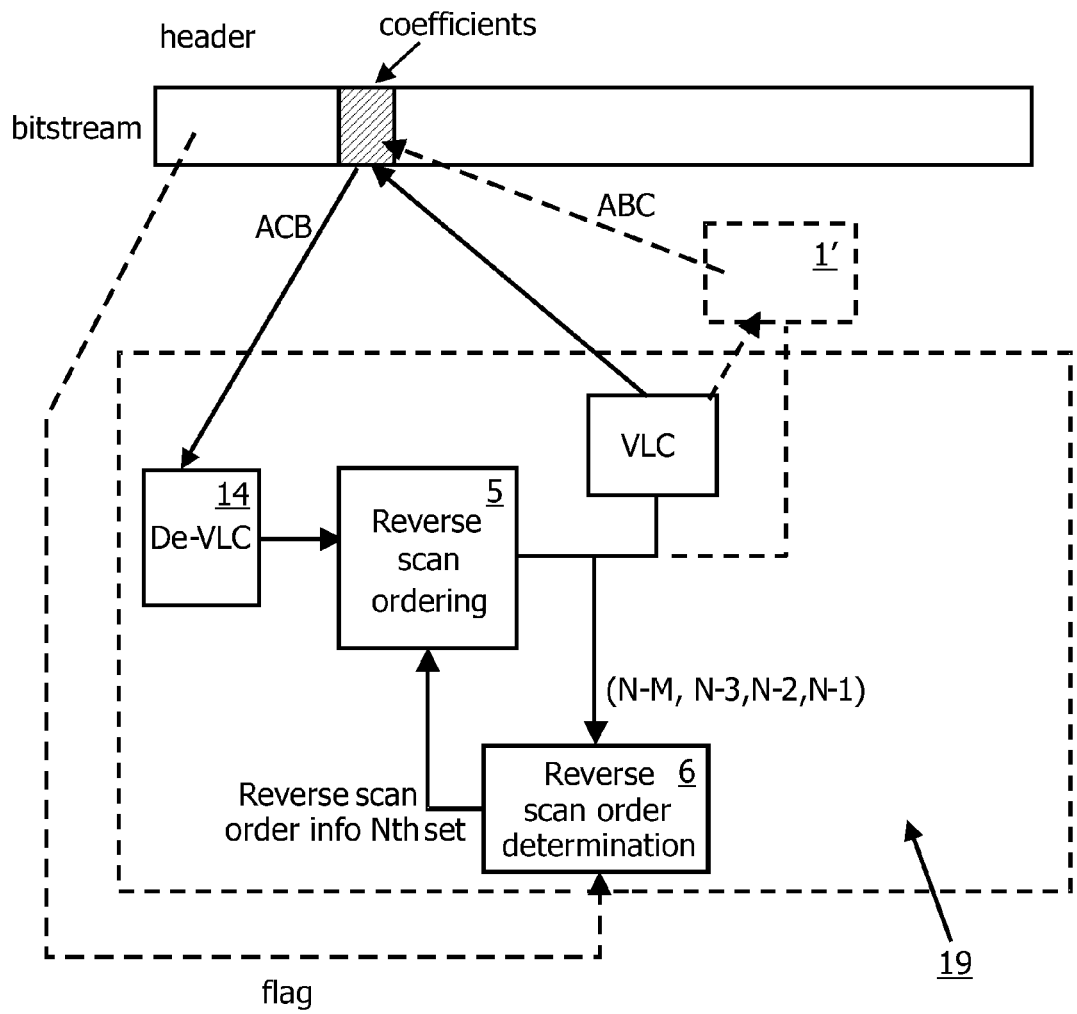

FIG. 17 illustrates such a transcoder-decoder 19. The original bitstream comprises coefficients ACB which have undergone a scan ordering in accordance with the invention. The header comprises information, in this figure as in previous figures schematically indicated by the word 'flag', on the used algorithm and or parameters used in the algorithm which is used in the reverse scan order determination. The transcoder-decoder transcodes, using the information in the header the coefficients of the bitstream into conventional ordered coefficients ABC and inserts them into the bitstream to replace the coefficients ACB. FIG. 17 also schematically illustrates yet another possibility. The flag may be removed from the header to save bits. After providing conventionally ordered coefficients, they are lead into an encoder 1' to undergo an encoding step in accordance with the invention with, however, different characteristics, for instance making use of a different algorithm or the same algorithm with different parameters for instance a new development, for instance to replace a bitstream made by use of an older version of a scan order determinator in accordance with the invention by a bitstream made by a novel version of a scan order determinator in accordance with the invention. In that case the transcoder 19 forms a decoder-encoder combination. In such embodiments the flags in the bitstream relating to the old version of the scan order determinator would be removed and replaced with flag relating to the novel version of the scan order determinator.

An encoder in accordance with the invention may be part of a transmitter and a decoder part of a receiver.

Transmitters within the concept of the invention include, but are not restricted to, devices comprising an image-capturing device and an encoder in accordance with the invention to encode data captured by the image-capturing device.

The image-capturing device may be a camera and a device in accordance with the invention having a camera are for instance image recording devices such as photo cameras, mobile phones with a camera, surveillance cameras, computers with camera devices, portable notebooks with a camera etc. The camera may be suited or used for taking still images or video sequences in monochrome or color or infrared. Other devices having an image-capturing device are for instance scanners, such as photo scanners, bar code scanners, iris scanners and fingerprint scanners. FIG. 15 illustrates a device in accordance with the invention having a camera.

Transmitters, within the concept of the invention, also comprise devices for recording information such as DVD recorders or devices by which on a memory card or stick or other storage medium a signal is written, such as in certain camera's. The signal to be encoded could be made by a device inside the transmitter, or the transmitter may have an input (such as an antenna or a cable input) for receiving an input signal. The device comprises an encoder, which produces an output signal, which output signal is provided to a writer to write the signal on a storage medium. Within the concept of the invention this is a transmitter, since the storage medium can be exchanged to another device, by which the signal is transmitted.

Receivers within the concept of the invention include, but are not restricted to, devices comprising a decoder in accordance with the invention and an image reproduction or image analysis device for reproducing or analyzing image of the decoded signal.

Such devices include TV's and computers provided with a display device, surveillance systems having monitors, barcode scanner data analyzing devices, iris recognition systems, fingerprint recognition devices and systems, mobile phones having a display screen, mobile personal assistance devices having a display screen, laptops having a display screen.

Receivers, within the concept of the invention, also comprise devices such as CD and DVD players, in general devices that are capable of receiving a signal, be it wireless or from a cable or from a storage medium such as a CD, memory stick, DVD etc, decoding the signal for sending the signal to an image display, such as a TV, monitor, etc.

It is remarked that, dependent on the functional capabilities of an apparatus, one and the same apparatus may be an encoder, decoder, receiver, transmitter and transcoder or any combination of such. A mobile phone with a camera and a display screen, for instance, has an image-capturing device but also a display device and it can receive images taken by others and transmit such images to yet other devices. It may have a program for recognizing faces.

The algorithmic components disclosed in this application may in practice be (entirely or in part) realized as hardware (e.g. parts of an application specific IC) or as software running on a special digital signal processor, or a generic processor, etc.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

In short the invention may be described as follows:

In a method of encoding and encoder a method step is performed in which the scan order of a set of image region modeling coefficients is established on the basis of information of set of image region modeling coefficients preceding said set of image region modeling coefficients, and said set of image region modeling coefficients subsequently undergoes a scan ordering.

It should be noted that the above-mentioned embodiments illustrate rather than limit the invention, and that those skilled in the art will be able to design many alternative embodiments without departing from the scope of the appended claims.

For instance images may be divided in sub-images, wherein the invention is applied to one or more sub-images rather than the image as a whole.

For instance, in the example reference is made to DCT (Discrete cosine transform) coefficients. DCT is one way of transforming data in the pixel domain in a transform domain. Other types of transformation (wavelet, Wahl etc) of data in the pixel domain to a transform domain are known and can be used within the concept of the invention. Also, although such transformation are usually done on blocks of size n×m, usually n×n, the transformation may be done on arbitrary shapes or objects using transform function suitable for such transformation.

In the claims, any reference signs placed between parentheses shall not be construed as limiting the claim.

The method of encoding and/or the method of decoding may form a method step in a method of image processing, which method of image processing may include steps preceding or following the steps of encoding and/or decoding. For instance, the image processing may include a step in which the image is reproduced and printed. The parameters or algorithm used may be dependent on the intended use of the image during further image processing. For instance if the quality of the image reproduction device or printer is known, this may be incorporated in the choice of algorithm or parameters for the algorithms, thus tuning the algorithms to the required quality during further processing of the image data.

The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The invention may be implemented by any combination of features of various different preferred embodiments as described above. In particular it is mentioned that any embodiment shown or claimed in relation to an encoding method or encoder has, unless otherwise indicated or impossible, a corresponding embodiment for a decoding method or decoder and such decoding methods and decoder are embodiments of the invention and claimed herewith.

The invention claimed is:

1. A computer program embodied in a non-transitory computer-readable medium for effecting the performance of a method of encoding a sequence of sets of image region modeling coefficients representing respective regions of an image into a sequence of reordered sets of image region modeling coefficients by repeatedly determining which of a plurality of different scan orders to use, said method comprising:
   a. using a predetermined one of the scan orders to scan a plurality of the image region modeling coefficients representing a respective region of the image;
   b. based on information from the already-scanned plurality of image region modeling coefficients, determining whether a different one of the scan orders has a higher probability of effectively encoding successive image region modeling coefficients representing another respective region of the image;
   c. if said probability is higher, using said different scan order for encoding the successive image region modeling coefficients; and
   d. repeatedly performing steps b and c for already-scanned modeling coefficients and yet-to-be-scanned modeling coefficients, respectively.

2. A computer program as in claim 1 where the different scan orders are predetermined and the probable effectiveness of each of said scan orders in encoding specific image region modeling coefficients is determined by calculating a respective fit parameter.

3. A computer program as claimed in claim 1 where the scan order is determined on the basis of statistical analysis of information of preceding sets of image region modeling coefficients.

4. A computer program as claimed in claim 1 where for already-scanned image region modeling coefficients determined to have an approximate value of zero at common positions the scan order for a following set of image region modeling coefficients is determined such that said coefficients are pushed back in the scan order.

5. A computer program as claimed in claim 1 where each of the sets of image region modeling coefficients comprises a plurality of coefficients and where for some of said plurality of coefficients the scan order is determined while for the remaining coefficients a fixed scan order is used.

6. A computer program as claimed in claim 1 where a plurality of different algorithms are used for determination of the scan order to be used.

7. An encoder for encoding a sequence of sets of image region modeling coefficients representing respective regions of an image into a sequence of reordered sets of image region modeling coefficients by repeatedly determining which of a plurality of different scan orders to use, said encoder comprising a scan order determinator for:
 a. selecting a predetermined one of the scan orders to scan a plurality of the image region modeling coefficients representing a respective region of the image;
 b. based on information from the already-scanned plurality of image region modeling coefficients, determining whether a different one of the scan orders has a higher probability of effectively encoding successive image region modeling coefficients representing another respective region of the image;
 c. if said probability is higher, using said different scan order for encoding the successive image region modeling coefficients; and
 d. repeatedly performing steps b and c for already-scanned modeling coefficients and yet-to-be scanned modeling coefficients, respectively.

8. An encoder as claimed in claim 7 where the different scan orders are predetermined and the probable effectiveness of each of said scan orders in encoding specific image region modeling coefficients is determined by calculating a respective fit parameter.

9. An encoder as claimed in claim 7, where the scan order is determined on the basis of statistical analysis of information of preceding sets of image region modeling coefficients.

10. An encoder as claimed in claim 7 where for already-scanned image region modeling coefficients having common zero values in preceding sets of image region modeling coefficients, the scan order for a following set of image region modeling coefficients is determined such that said coefficients are pushed back in the scan order.

11. An encoder as claimed in claim 7 where each of the sets of image region modeling coefficients comprises a plurality of coefficients and where for some of said plurality of coefficients the scan order is determined while for the remaining coefficients a fixed scan order is used.

12. An encoder as claimed in claim 7, where the scan order determinator uses a plurality of different algorithms for determining the scan orders to be used.

13. An encoder as claimed in claim 12 where the encoder is operative to add information pertaining to the algorithm used in the scan ordering to a signal comprising the reordered sets of image region modeling coefficients.

14. A transmitter including an encoder for encoding a sequence of sets of image region modeling coefficients representing respective regions of an image into a sequence of reordered sets of image region modeling coefficients by repeatedly determining which of a plurality of different scan orders to use, said encoder comprising a scan order determinator for:
 a. selecting a predetermined one of the scan orders to scan a plurality of the image region modeling coefficients representing a respective region of the image;
 b. based on information from the already-scanned plurality of image region modeling coefficients, determining whether a different one of the scan orders has a higher probability of effectively encoding successive image region modeling coefficients representing another respective region of the image;
 c. if said probability is higher, using said different scan order for encoding the successive image region modeling coefficients; and
 d. repeatedly performing steps b and c for already-scanned modeling coefficients and yet-to-be scanned modeling coefficients, respectively.

15. A transmitter as claimed in claim 14, said transmitter comprising an image-capturing device.

16. A transmitter as claimed in claim 14, said transmitter comprising a device for recording information.

17. A computer program embodied in a non-transitory computer-readable medium for effecting the performance of a method of decoding a sequence of reordered sets of image region modeling coefficients produced by an encoder into a sequence of reconstructed sets of image region modeling coefficients representing respective regions of an image, said method comprising performing a reverse scan ordering based on a known algorithm used by the encoder for reordering image region modeling coefficients in which:
 a. a predetermined one of a plurality of scan orders is used to scan a plurality of the image region modeling coefficients representing a respective region of the image;
 b. based on information from the already-scanned plurality of image region modeling coefficients, it is determined whether a different one of the scan orders has a higher probability of effectively encoding successive image region modeling coefficients representing another region of the image;
 c. if said probability is higher, using said different scan order for encoding the successive image region modeling coefficients; and
 d repeatedly performing steps b and c for already-scanned modeling coefficients and yet-to-be scanned modeling coefficients, respectively.

18. A computer program as in claim 17 where the probable effectiveness of each of said scan orders in encoding specific image region modeling coefficients is determined by calculating a respective fit parameter.

19. A computer program as claimed in claim 17 where the reverse scan orders are determined on basis of statistical analysis of preceding reconstructed sets of image region modeling coefficients.

20. A computer program as claimed in claim 17, where for already reconstructed image region modeling coefficients having common zero values the reverse scan order for a following reordered set of image region modeling is such that said coefficients are pushed back in the reverse scan order.

21. A computer program as claimed in claim 17 where each of the sets of image region modeling coefficients comprises a plurality of coefficients and where for some of said plurality of coefficients the reverse scan order is determined while for the remaining coefficients a fixed reverse scan order is used.

22. A computer program as claimed in claim 17 where a plurality of different algorithms are used for determination of the reverse scan order to be used.

23. A decoder for decoding a sequence of reordered sets of image region modeling coefficients produced by an encoder into a sequence of reconstructed sets of image region modeling coefficients representing respective regions of an image, said decoder comprising a reverse scan order determinator for performing a reverse scan ordering based on a known algorithm used by the encoder for reordering image region modeling coefficients in which:
  a. a predetermined one of a plurality of scan orders is used to scan a plurality of the image region modeling coefficients representing a respective region of the image;
  b. based on information from the already-scanned plurality of image region modeling coefficients, it is determined whether a different one of the scan orders has a higher probability of more effectively encoding successive image region modeling coefficients representing another region of the image;
  c. if said probability is higher, using said different scan order for encoding the successive image region modeling coefficients; and
  d. repeatedly performing steps b and c for already-scanned modeling coefficients and yet-to-be-scanned modeling coefficients, respectively.

24. A decoder as claimed in claim 23 where the different scan orders are predetermined and the probable effectiveness of each of said scan orders in encoding specific image region modeling coefficients is determined by calculating a respective fit parameter.

25. A decoder as claimed in claim 23, where the reverse scan order is determined on the basis of statistical analysis of preceding reconstructed sets of image region modeling coefficients.

26. A decoder as claimed in claim 23, where for already reconstructed sets of image region modeling coefficients having common zero values the reverse scan order for a following reordered set of image region modeling coefficients is determined such that said coefficients are pushed back in the reverse scan order.

27. A decoder as claimed in claim 23 where each of the sets of image region modeling coefficients comprises a plurality of coefficients, and where for some of the plurality of coefficients the reverse scan order is determined while for the remaining coefficients a fixed reverse scan order is used.

28. A decoder as claimed in claim 23 where the reverse scan order determinator uses a plurality of different algorithms for determination of the reverse scan order to be used.

29. A receiver comprising a decoder as claimed in claim 23.

30. A receiver as claimed in claim 29, said receiver comprising an image reproduction device.

* * * * *